United States Patent
Dickey et al.

(10) Patent No.: US 9,713,219 B1
(45) Date of Patent: Jul. 18, 2017

(54) SOLID STATE POWER CONTROLLER FOR AEROSPACE LED SYSTEMS

(71) Applicant: Hamilton Sundstrand Corporation, Charlotte, NC (US)

(72) Inventors: John A. Dickey, Caledonia, IL (US); Josh C. Swenson, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 14/991,538

(22) Filed: Jan. 8, 2016

(51) Int. Cl.
  *B60Q 1/14* (2006.01)
  *H05B 33/08* (2006.01)
  *B64D 47/02* (2006.01)

(52) U.S. Cl.
  CPC ......... *H05B 33/0851* (2013.01); *B64D 47/02* (2013.01); *H05B 33/089* (2013.01); *H05B 33/0812* (2013.01); *H05B 33/0815* (2013.01)

(58) Field of Classification Search
  CPC ..................... H05B 33/0851; B60Q 3/0293
  USPC .................................. 315/77, 291, 307, 308
  See application file for complete search history.

(56) References Cited

U.S. PATENT DOCUMENTS

| | | | |
|---|---|---|---|
| 7,391,335 B2 * | 6/2008 | Mubaslat | G01R 31/2635 315/224 |
| 8,183,789 B2 * | 5/2012 | Mantovani | H05B 37/02 315/291 |
| 8,390,151 B2 * | 3/2013 | Rozman | H02J 1/08 307/140 |
| 8,410,716 B2 | 4/2013 | Yao et al. | |
| 8,492,987 B2 | 7/2013 | Nuhfer et al. | |
| 9,013,114 B2 | 4/2015 | Archenhold | |
| 9,078,327 B2 | 7/2015 | Livschitz et al. | |
| 9,119,238 B2 | 8/2015 | Hu et al. | |
| 9,119,262 B2 | 8/2015 | Melanson et al. | |
| 9,161,406 B2 | 10/2015 | Saes | |
| 9,516,706 B2 * | 12/2016 | Shan | H05B 33/0803 |
| 2011/0080110 A1 | 4/2011 | Nuhfer | |
| 2011/0148323 A1 | 6/2011 | Yao | |
| 2012/0176064 A1 | 7/2012 | Saes | |
| 2013/0154500 A1 | 6/2013 | Hu | |
| 2013/0214697 A1 | 8/2013 | Archenhold | |
| 2013/0300311 A1 | 11/2013 | Hsieh et al. | |
| 2014/0042933 A1 | 2/2014 | Livschitz | |
| 2015/0145427 A1 | 5/2015 | Melanson | |

* cited by examiner

*Primary Examiner* — Thuy Vinh Tran
(74) *Attorney, Agent, or Firm* — Cantor Colburn LLP

(57) ABSTRACT

A light emitting diode (LED) control system may include a LED control system for an aircraft. The LED control system may include an LED power controller, and a solid state power controller (SSPC) that includes a processor in communication with the LED power controller, where the LED power controller and the solid state power controller are integrated onto a single power module. The LED control system is configured to receive DC power from a power source, determine, via the processor, current flow through a series MOSFET element connecting to at least one LED, to control operational voltage across the at least one LED, and adjust, via the processor, a gate voltage of the series MOSFET element with the LED power controller.

18 Claims, 6 Drawing Sheets

US 9,713,219 B1

SOLID STATE POWER CONTROLLER FOR AEROSPACE LED SYSTEMS

BACKGROUND

The present disclosure relates to solid state power control systems, and more specifically, to a solid state power controller (SSPC) for aerospace light emitting diode (LED) systems.

Modern aircraft lighting systems (internal and external lighting systems) are moving to LED based solutions due to the increased efficiency, reliability, and controllability of LEDs. LED lights are typically arranged in series strings of LEDs that are driven with a controlled current to ensure consistent intensity of each LED element. Traditional aircraft power systems are developed around incandescent lights driven directly from the distributed aircraft voltage. Current LED lighting systems fit into a traditional aircraft electrical power system as shown in FIG. 1. Conventional electrical power distribution systems may include a circuit protection device 1 to disconnect a load such as, for example, LED light string 2 in case of a fault. This protection device in modern aircraft is often a solid state power controller (SSPC). Circuit protection device 1 often connects to a LED light power conversion module 3, which controls LED light string 2. As shown in FIG. 2, electrical power distribution systems may include a circuit protection device 206 to disconnect the load 208 from the aircraft power 202 in case of fault. Circuit protection device 206, found in most modern aircrafts, is often a solid state power controller (SSPC). The SSPC typically protects the aircraft wiring and electrical power system from faults in the load or load wiring by implementing $I^2 t$ protection circuitry. Retrofitting LED lighting solutions to existing SSPCs requires additional power electronics to convert the distributed voltages into a controlled current. The addition of additional power control elements can add weight to the aircraft and may further add complexity in maintaining the various components.

SUMMARY

According to an embodiment of the present invention, an LED control system for an aircraft is described. The LED control system may include a light emitting diode (LED) control system for an aircraft. The LED control system may include an LED power controller, and a SSPC that includes a processor in communication with the LED power controller, where the LED power controller and the SSPC are integrated onto a single power module. The LED control system is configured to receive DC power from a power source, determine, via the processor, current flow through a series MOSFET element connecting to at least one LED, to control operational voltage to the at least one LED, and adjust, via the processor, a gate voltage across the series MOSFET element with the LED power controller.

In another embodiment of the present invention, a computer-implemented method for controlling a light emitting diode (LED) control system for an aircraft is described. The computer-implemented method may include configuring a processor in an LED power controller to be in communication with a SSPC, where the LED power controller and the SSPC are integrated into a single power module. The method may further include receiving, at the single power module, DC power from a power source, determining, via the processor, a current across a series MOSFET element connecting to at least one LED, to control operational voltage to the at least one LED, and adjusting, via the processor, a gate voltage of the series MOSFET element with the LED power controller.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
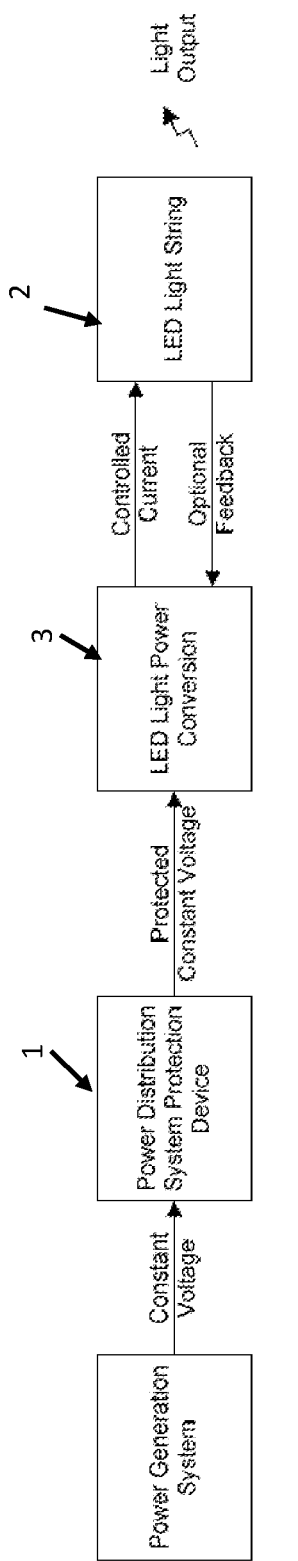
FIG. 1 depicts a flow diagram of a conventional LED power control system for an aircraft (prior art)
Figure 2:
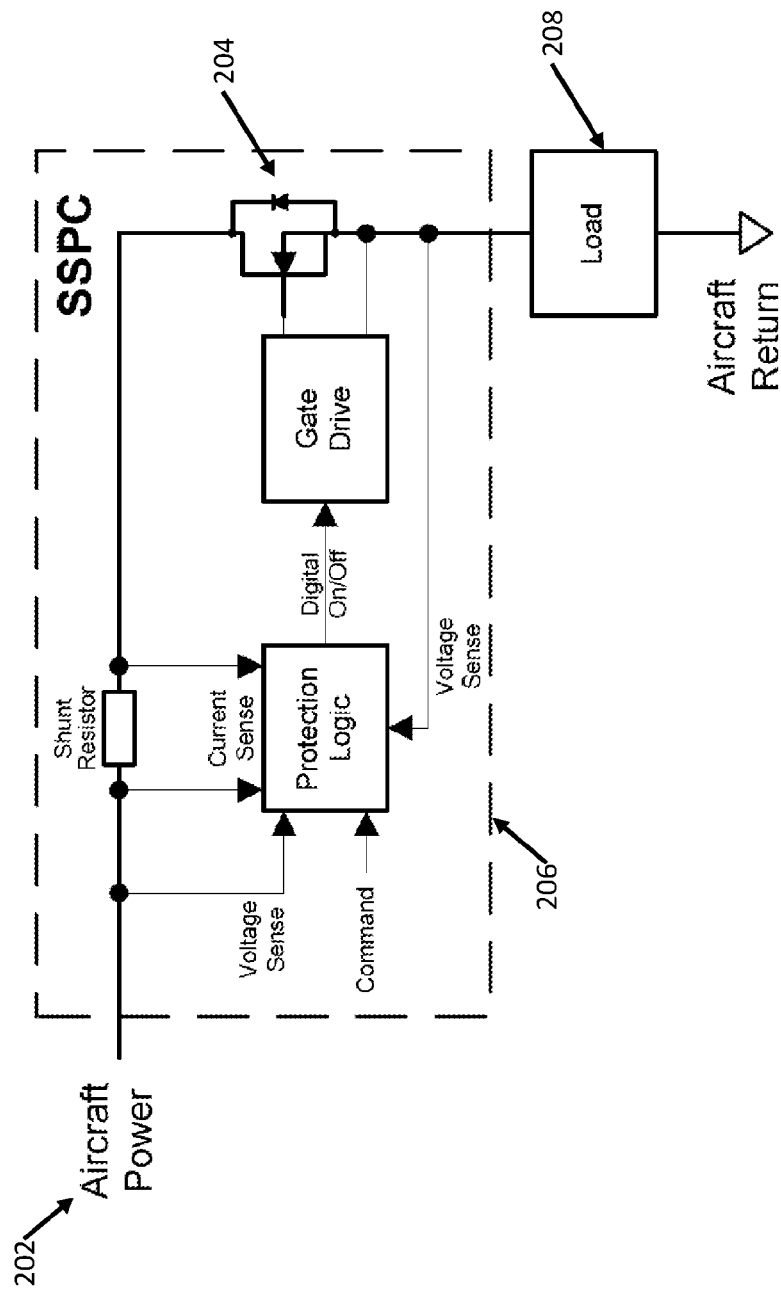
FIG. 2 depicts a schematic of the conventional Power Distribution System Protection Device of FIG. 1 (prior art)
Figure 3:
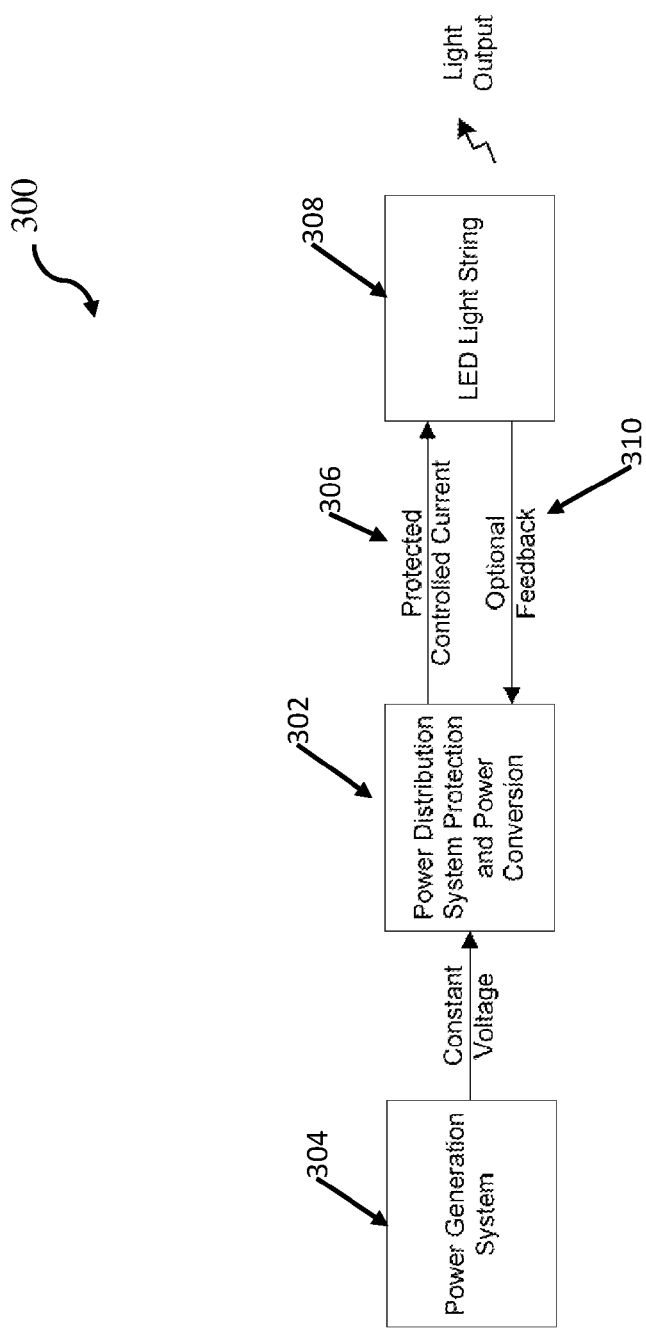
FIG. 3 illustrates a block diagram of a system for use in practicing the teachings herein.

FIG. 3 depicts a flow diagram of a light emitting diode (LED) control system (hereafter system 300) for an aircraft, according to one embodiment. System 300 may include a combined power distribution system protection module (SSPC) and power conversion/controller module 302 (hereafter "system 302"). According to some embodiments, system 302 may include a processor in communication with an LED power controller, where the LED power controller and the SSPC are integrated onto a single power module. The SSPC may be constructed on a power module and contained in a secondary power distribution assembly (SPDA). System 302 may be a removable card that slides into a chassis of an aircraft control system rack.

According to some embodiments, system 302 may receive a constant voltage from a power source, such as, for example, generation system 304 or a power storage device (not shown), provide protected controlled current 306 to at least one LED light in an LED light string 308, and receive optional feedback 310 from the LED light string. According to some embodiments, the feedback from the LED could include feedback information including the status of the LED lights, including brightness information, aging data, or other information about the health and status of the LED(s) (e.g., LED light string 308). In some aspects, system 302 may receive the feedback information and output the information to an operatively connected display (not shown). For example, the status may include a warning and/or maintenance information for LED light string 308. In other embodiments, the status may include LED aging information, which may be indicative of the age of one or more LED lights in terms of service hours and/or remaining operational life after installation.

Figure 4:
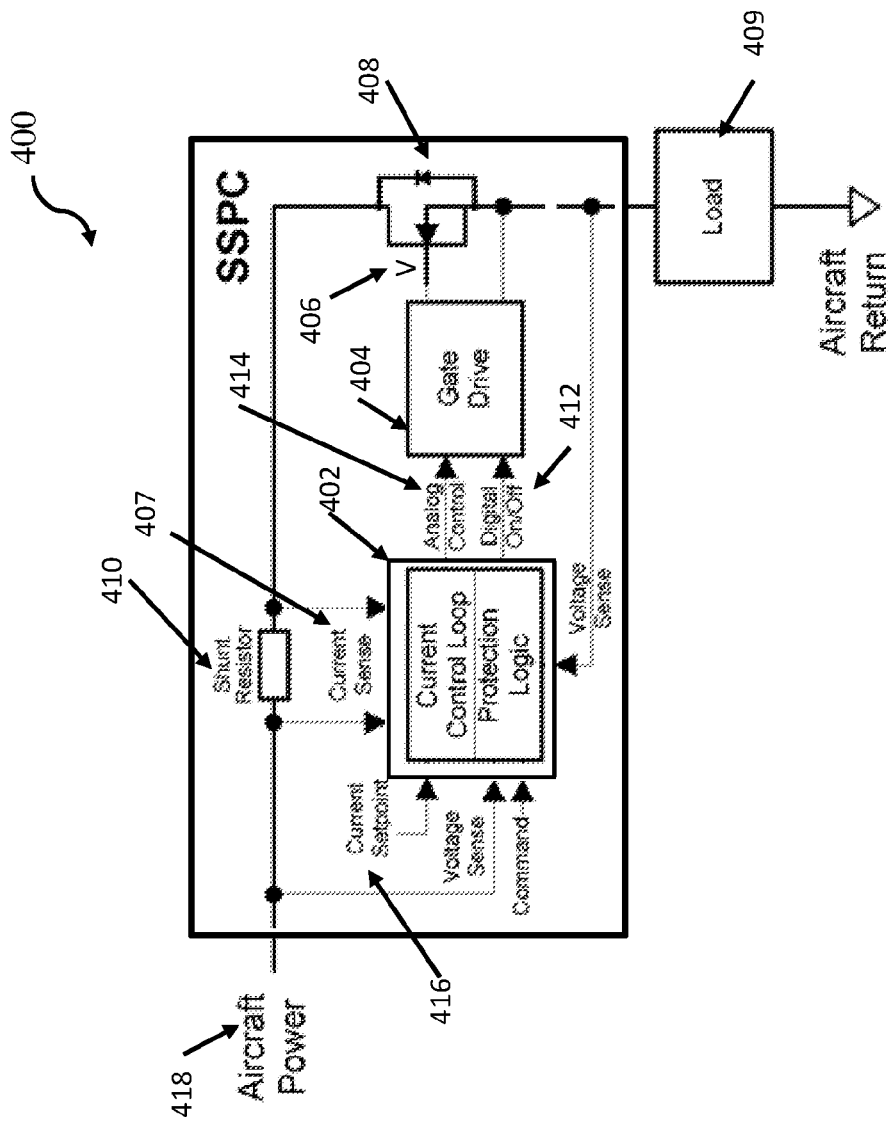
FIG. 4 depicts a schematic of a linear LED control system for an aircraft according to one embodiment.

FIG. 4 depicts a schematic of LED control system 400 for an aircraft, according to one embodiment. According to some embodiments, an LED power controller and a SSPC can be integrated onto a single power module (e.g., system 302). System 400 may include a processor 402 in communication with an LED power controller 404, which may be functional as a gate drive. System 400 may further include a series MOSFET element 408. In some aspects, processor 402 may be configured to pass a predetermined current through series MOSFET element 408 by either increasing or decreasing total circuit impedance. System 400 may also include current sensing circuitry 407 that may be configured to sense current across a shunt resistor 410. Other methods of current sensing could be used for example hall effort sensors.

System 400 may be configured to regulate current with linear current regulators via a digital or analog control loop (412 and 414, respectively) based on a predetermined current set point 416 and the measured actual current across shunt resistor 410. Accordingly, processor 402 may measure, via the processor, a current across shunt resistor 410 and/or series MOSFET element 408 connecting to at least one LED (e.g., load 409), to control operational voltage across the load. Processor 402 may adjust a gate voltage 406 of series MOSFET element 408 with the LED power controller 404. In some aspects, processor 402 may cause series MOSFET element 408 to function as a controlled resistance by increasing or decreasing the total circuit impedance to achieve a predetermined current, thus representing a linear regulator example embodiment. For example, processor 402 may cause series MOSFET element 408 to maintain a predetermined current of 1000 mA. Processor 402 may also implement all the protection and built in test functionality of a conventional SSPC. For example, processor 402 may execute $I^2t$ protection algorithms.

Figure 5:
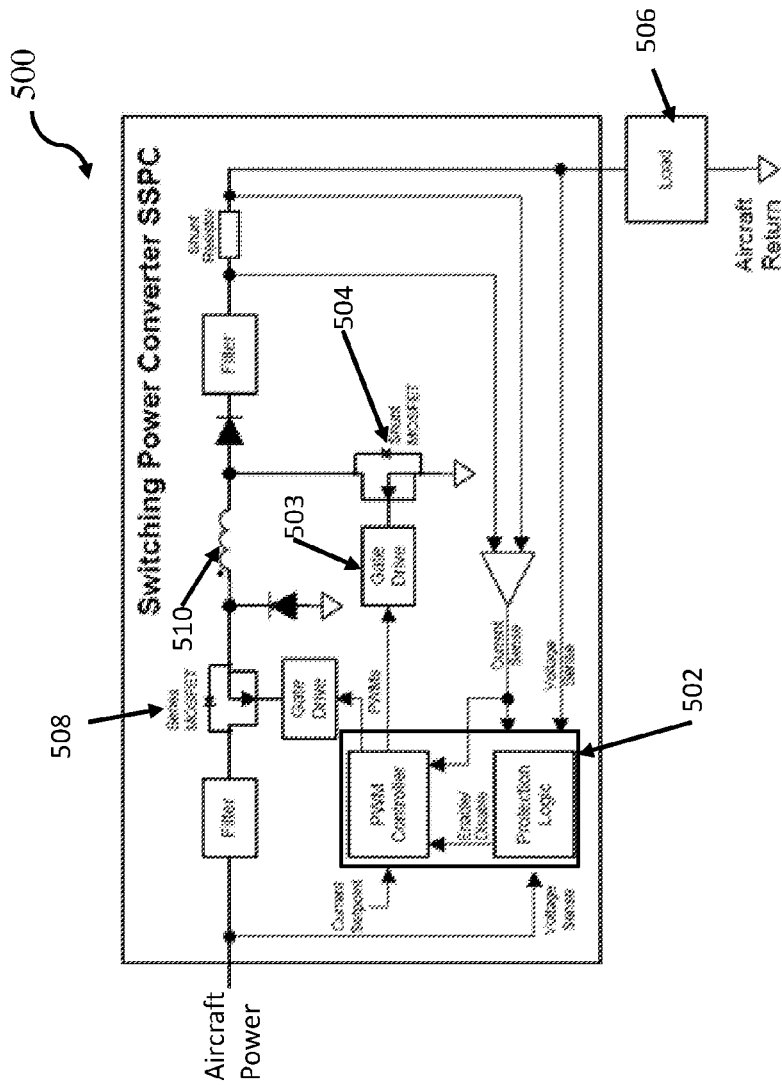
FIG. 5 depicts a schematic of a switching LED control system for an aircraft according to one embodiment.

FIG. 5 depicts a schematic of an LED control system 500 for an aircraft, according to another embodiment. System 500 may be operable as a switching power converter, and may include a layout similar to system 400, including a LED power controller 503 operable as a gate drive. System 500 may further include an inductive element 510, a shunt MOSFET element 504 added in series with respect to ground, and a series MOSFET element 508 along with appropriately placed diodes for clamping and rectifying. Accordingly, processor 502 may be configured to modulate at least one of the series MOSFET element 508, or shunt MOSFET element 504, or both, with a pulse modulation signal. In some aspects, processor 502 may pass a predetermined current to at least one LED (e.g., load 506) by pulsing either a buck current or a boost current to load 506. For example, it may be advantageous to output a voltage lower than an input (from 20v input to 10v output). Accordingly, processor 502 may configure series MOSFET element 508, and an inductor circuit 510 to create a buck circuit. Accordingly, series MOSFET element 508 closed to pulse current through inductor 510 in BUCK mode. In other aspects, it may be advantageous to output a higher voltage in boost mode. Accordingly, processor 502 may configure shunt MOSFET element 504 to create a voltage gain.

Figure 6:
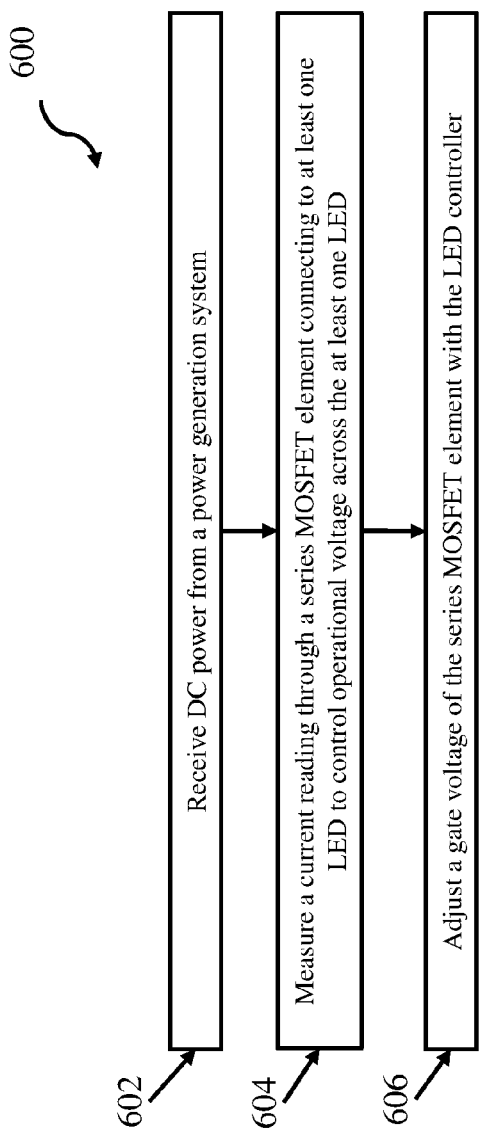
FIG. 6 depicts a flow diagram of a method for controlling an LED control system for an aircraft according to one embodiment.

FIG. 6 depicts a flow diagram of a method 600 for controlling an LED control system for an aircraft, according to one embodiment. Referring now to FIG. 6, in some embodiments system 302 may receive DC power 418 from a power generation system onboard the aircraft, as shown in block 602. As shown in block 604, processor 402 may measure current flow through a series MOSFET element connecting to at least one LED to control operational voltage across the at least one LED.

According to some embodiments, by combining the LED light power controller with the power distribution system SSPC, and control functionality into a single card, several performance advantages may be realized. The modified SSPC may be constructed on a power module and contained in a secondary power distribution assembly (SPDA) similar to existing SSPC power modules on current aircrafts. As with any aerospace application, weight is paramount. By combining these functions to one cohesive system, several of the system controllers and their redundancies merge, causing a net reduction in weight. Moreover, the various disparate systems that may now be unified into a single card may be more easily maintained and/or replaced in the field by aircraft maintenance personnel. In other aspects, an output MUX may be configured to select one or more groups of LED's for control by the combined system thus allowing lights that are not used at the same time to be controlled by one controller further reducing cost, size, and weight.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The flowchart and block diagrams in the Figures illustrate the architecture, functionality, and operation of possible implementations of systems and methods according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A light emitting diode (LED) control system for an aircraft comprising:
   an LED power controller; and
   a solid state power controller (SSPC) comprising:
   a processor in communication with the LED power controller, wherein the LED power controller and the SSPC are integrated onto a single power module; and
   a shunt MOSFET element and an inductive element connected between a series MOSFET element and a ground;

wherein the LED control system is configured to:
receive DC power from a power source;
determine, via the processor, a current flow through the series MOSFET element connecting to at least one LED, to control operational voltage across the at least one LED; and
adjust, via the processor, a gate voltage of the series MOSFET element with the LED power controller.

2. The LED control system of claim 1, wherein the single power module is configured to operate as part of a secondary power distribution assembly (SPDA).

3. The LED control system of claim 1, wherein the processor is configured to pass a predetermined current through the series MOSFET element by either increasing or decreasing a total circuit impedance via the series MOSFET element.

4. The LED control system of claim 1, wherein the processor is configured to modulate at least one of the series MOSFET element and the shunt MOSFET element with a pulse modulation signal.

5. The LED control system of claim 4, wherein the processor is configured to pass a predetermined current to the at least one LED by pulsing either a buck current or a boost current.

6. The LED control system of claim 1, wherein the processor is further configured to receive feedback information from the LED power controller, wherein the feedback information is indicative of a status of the at least one LED.

7. The LED control system of claim 6, wherein the status includes brightness information indicative of a relative brightness of the at least one LED.

8. The LED control system of claim 6, wherein the status includes aging data indicative of an age of the at least one LED.

9. The LED control system of claim 6, wherein the status is indicative of a health and status of the at least one LED.

10. A computer-implemented method for controlling a light emitting diode (LED) control system for an aircraft comprising:
configuring a processor in an LED power controller to be in communication with a solid state power controller (SSPC), wherein the LED power controller and the SSPC are integrated into a single power module;
receiving, at the single power module, DC power from a power source;
determining, via the processor, current flow through a series MOSFET element connecting to at least one LED, to control operational voltage across the at least one LED; and
a shunt MOSFET element and an inductive element connected between a series MOSFET element and a ground; and
adjusting, via the processor, a gate voltage of the series MOSFET element with the LED power controller.

11. The computer-implemented method of claim 10, wherein the single power module is configured to operate as part of a secondary power distribution assembly (SPDA).

12. The computer-implemented method of claim 10, comprising:
passing, via the processor, a predetermined current through the series MOSFET element by either increasing or decreasing a total circuit impedance via the series MOSFET element.

13. The computer-implemented method of claim 10, further comprising modulating, via the processor, at least one of the series MOSFET element and the shunt MOSFET element with a pulse modulation signal.

14. The computer-implemented method of claim 10, further comprising passing, via the processor, a predetermined current to the at least one LED by pulsing either a buck current or a boost current, or both of the buck current and the boost current.

15. The computer-implemented method of claim of claim 10, further comprising receiving feedback information from the LED power controller, wherein the feedback information is indicative of a status of the at least one LED.

16. The computer-implemented method of claim 15, wherein the status includes brightness information indicative of a relative brightness of the at least one LED.

17. The computer-implemented method of claim 15, wherein the status includes aging data indicative of an age of the at least one LED.

18. The computer-implemented method of claim 15, wherein status is indicative of a health and status of the at least one LED.

* * * * *